United States Patent [19]
Chou

[11] Patent Number: 4,887,205
[45] Date of Patent: Dec. 12, 1989

[54] GATE CONTROL SYSTEM

[76] Inventor: Tom M. Chou, 800 Avendia Salvador, San Clemente, Calif. 92672

[21] Appl. No.: 65,191

[22] Filed: Jul. 1, 1987

[51] Int. Cl.[4] .................. E05F 15/10; E05F 15/20; H02P 1/22; H02P 1/04
[52] U.S. Cl. .................................. 364/400; 49/25; 49/26; 49/30; 49/28; 49/280
[58] Field of Search .............. 49/31, 26, 28, 29, 30, 49/25, 280, 139, 140; 364/400; 187/52 R; 340/927, 47, 51

[56] References Cited

U.S. PATENT DOCUMENTS

| | | | |
|---|---|---|---|
| 3,993,975 | 11/1976 | Long, Jr. et al. | 49/25 X |
| 4,121,382 | 10/1978 | Dietrich et al. | 49/280 X |
| 4,142,326 | 3/1979 | Schmitz | 49/280 X |
| 4,281,475 | 8/1981 | Spadoni-Censi | 49/28 |
| 4,328,540 | 5/1982 | Matsuoka et al. | 49/28 X |
| 4,338,553 | 7/1982 | Scott, Jr. | 49/31 X |
| 4,383,778 | 5/1983 | Costa | 400/569 |
| 4,471,274 | 9/1984 | Ross et al. | 318/282 |
| 4,472,910 | 9/1984 | Iha | 49/139 |
| 4,511,832 | 4/1985 | Schmitz | 318/685 |
| 4,549,369 | 10/1985 | Foley, Jr. | 49/280 X |
| 4,621,223 | 11/1986 | Murakami et al. | 49/28 X |
| 4,628,636 | 12/1986 | Folger | 49/139 X |
| 4,638,433 | 1/1987 | Schindler | 364/400 |
| 4,658,543 | 4/1987 | Carr | 49/139 |

Primary Examiner—Clark A. Jablon
Attorney, Agent, or Firm—Weissenberger & Peterson

[57] ABSTRACT

A system for controlling a gate includes a microprocessor which normally automatically recloses a gate after it has been opened in response to a radio or sensor loop signal, and which normally locks the gate against movement when the gate motor is stopped. When an obstruction is sensed in the path of the gate, the automatic reclosing feature and the sensor loops are disabled, the gate drive remains unlocked even though the motor is stopped, and the response of the system to a radio signal is changed to produce alternating opening and closing of the gate on successive radio signals. At all times, the gate drive lock is released before the motor is started and is not engaged until after the gate has come to rest. Field adjustment of the obstruction sensor is avoided by generating an obstruction signal only when the gate speed falls below the operating speed of a gate imposing the largest design load on the motor, and the speed at which an obstruction is sensed is adjustable in discrete increments by digital switches so that the specific load level at which the system sees an obstruction may be selected to fit various conditions.

9 Claims, 8 Drawing Sheets

GATE CONTROL SYSTEM

BACKGROUND OF THE INVENTION

1. Technical Field

This invention relates generally to automatic gates, and more particularly to a new and improved system for controlling automatic gate operation.

2. Background Information

Motor driven automatic gates often employ a control mechanism that is activated by a gate controller. Operation of the controller by any of various input devices, such as a handheld transmitter unit, sensor loops buried in the roadway, or pushbutton wired to the controller, causes the gate to open and close on command. In this manner, convenient gate operation is accomplished in many applications where it is desired to do so automatically.

However, existing gate controllers suffer from certain drawbacks that need to be overcome. For example, existing controller arrangements often inadequately respond to such contingencies as an obstruction in the path of the gate. In other words, a vehicle or child may be in the way when the gate is operated, and failure to sense this obstruction and alter gate control accordingly may result in significant property damage and personal injury. Thus, this aspect of automatic gate operation is of recognized significance and each detail of gate control is of corresponding importance.

Specifically, an obstruction occurring while the gate is closing is typically caused by different events than an obstruction while the gate is opening, and different control responses are of value in avoiding damage or injury. Although existing gate controllers are able to distinguish between obstructions on opening and obstructions on closing, and are therefore able to take different types of action in response to these different kinds of obstructions, those actions are generally limited to reopening the gate on a closing obstruction, and to stopping it on an opening obstruction.

Another drawback of existing controllers is that the conventional solenoid-operated locking finger or bar which prevents the unintentional moving of the gate by locking the gate's drive train is engaged and disengaged simultaneously with the stopping and starting of the motor. Because the gate has some inertia, this simultaneous engagement creates stresses on the drive mechanism which are prone to result in maintenance problems.

Finally, gate sizes constructions, and locations differ, as well as the type of obstruction, and existing controllers that sense obstructions by monitoring gate speed often require modification or time consuming, periodic adjustment to accommodate the corresponding differences in normal gate speed, and the amount of variance anticipated.

Consequently, it is desirable to have a new and improved controller that overcomes these concerns—one responsive to obstructions in a manner designed to better inhibit damage or injury to the obstruction as well as to the gate mechanism, and one better able to accommodate different types of gates and different types of obstructions.

SUMMARY OF THE INVENTION

The invention overcomes these disadvantages of the prior art by providing a microprocessor-based control system which not only reopens the gate on a closing obstruction and stops it on an opening obstruction, but also does the following:

(1) unlocks the drive train for several minutes to allow manual movement of the gate with the motor stopped;
(2) defeats the autoclose feature of the controller to prevent the gate from reclosing again automatically when it has reopened as a result of a closing obstruction;
(3) defeats the operation of the sensor loops to allow free movement of the gate in both directions even though a car is sitting on a loop;
(4) changes the operation of the handheld radio control from open-with-automatic-reclose to alternating open, stop and close on successive impulses.

The system also provides delay means which delay the starting of the motor for a few seconds after a gate actuation command has been received to give the drive train unlocking solenoid ample time to withdraw the locking finger from engagement with the drive train. Corresponding delay means delay release of the unlocking solenoid following stopping of the motor so that the locking finger cannot engage the drive train before the gate has actually come to a full stop.

The field adjustment of the gate speed sensor circuits to match the normal operating speed of any given gate is avoided by setting the speed level at which an obstruction indication is generated below the minimum normal operation speed expected to be encountered with any gate for which the motor and drive train are designed. It has been found that this can be readily done without significantly affecting the system's ability to recognize obstructions before substantial damage or injury occurs. In addition, manually settable dip switches are provided for onsite determination of the speed level at which an obstruction indication is recorded.

Generally, the system of this invention includes a microprocessor with programming for receiving a plurality of input command signals indicative of a plurality of operations to be performed by a gate to be controlled and a plurality of input data signals indicative of the position of the gate (gate position) and the speed of the gate (gate speed). The microprocessor generates a plurality of output control signals for purposes of controlling operation of the gate under program control according to the input signals, and it may be any of various commercially available microprocessor chips with sufficient memory and programming coded according to known techniques to accomplish the novel combination of functions described.

The programming includes subroutines or drivers that generate open gate, close gate, stop gate and lock gate control signals. These control the gate motor and thus the gate. The programming provides an alternating mode in which the open gate driver and close gate driver are activated alternately in response to successive occurrences of an activate gate input command signal. In other words, pushing the button on a handheld transmitter will cause the gate to open on one push and close on the next. In an automatic close mode, however, the gate opens and then closes automatically after a predetermined interval for each push of the button.

The programming also provides an obstruction mode. A first aspect of the obstruction mode responds to the speed of the gate falling below a predetermined level for activating the stop gate driver to stop the gate. If the obstruction occurs while the gate is closing, an open-on-obstruction switch in the controller allows the selection of two responses: either the gate may be made to remain stopped, or the gate may be made to reopen immediately and remain open, until another activate gate command signal is received.

A second aspect of the obstruction mode responds to the speed of the gate falling below the predetermined level as the gate is opening. When this happens, the stop gate driver is activated to cause the gate to stop and remain stopped.

A third aspect of the obstruction mode provides an obstruction lock delay for maintaining the gate unlocked for a substantial predetermined period of time following the occurrence of any obstruction to enable clearance of the obstruction.

In line with the above, it is an object of this invention to provide a new and improved gate controller system for controlling an automatic gate.

It is another object of this invention to provide such a new and improved system that disables those automatic features of the system which might result in additional harm after an obstruction has occurred, while maintaining the operability of the gate both by manual power control and by physical movement by hand without the motor.

It is yet another object to provide such a system that prevents stressing of the gate's drive train by the automatic locking mechanism.

It is still another object of the invention to provide such a system which needs no field adjustment when used with different types of gates, but which nevertheless enables field adjustment according to the type of obstruction anticipated and other environmental considerations.

DESCRIPTION OF THE PREFERRED EMBODIMENTS

Figure 1A:
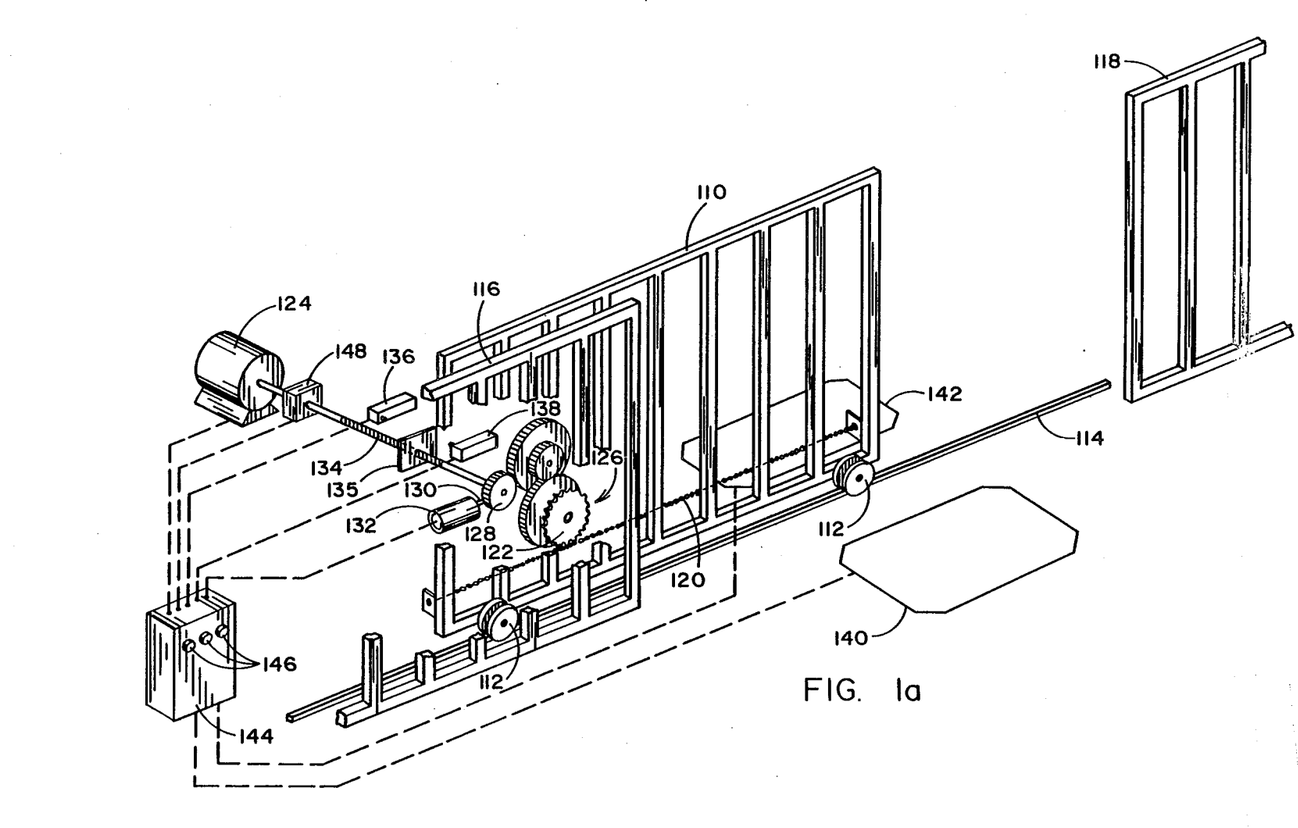
FIG. 1a is a partially exploded and schematized perspective view of a gate installation using the invention.

FIG. 1a shows, in schematic form, the environment in which the present invention operates. A gate 110 rolling on wheels 112 along a track 114 closes off the space between fixed fence elements 116 and 118. The gate 110 is driven by a chain 120 which is engaged by a sprocket wheel 122. The sprocket wheel 122 is powered by a motor 124 through an appropriate drive train or transmission 126 which includes gears such as gear 128.

In order to prevent the gate 110 from being pushed open when the power is off, or from moving for other reasons when it is not being actuated, a steel bar or locking finger 130 is normally biased into engagement with the teeth of the gear 128 to prevent the gear 128 from turning. The locking finger 130 can be withdrawn from engagement with the gear 128 by energizing a solenoid 132.

Although the motor 124 is conventionally equipped with electrical braking means designed to stop the gate 110 quickly when the opening or closing motion of the gate 110 is completed, the gate 110 cannot stop instantly. If the solenoid 132 is released or energized simultaneously with the stopping or starting of motor 124, undesirable stresses occur as the locking finger 130 engages the still or already moving gear 128. In accordance with the invention, these stresses are eliminated by energizing solenoid 132 a few seconds before starting the motor 124, and not releasing it until a few seconds after the motor 124 has stopped.

A worm gear 134 on the drive train conventionally carries a slider 135 which engages an open limit switch 136 when the gate 110 is in the fully open position, and a closed limit switch 138 when the gate 110 is in the fully closed position. The function of these limit switches in the control apparatus of this invention will be described in more detail below.

Conventional capacitive sensor loops 140 and 142 may be embedded in the pavement on each side of the gate 110 to sense the presence of a car near or in the gate area. The signal produced by the sensor loops 140 and 142 may be used to trigger gate actuation, to prevent closing of the gate 110 onto a car, or both.

A control box 144 is provided to contain the control circuitry hereinafter described, as well as the motor and drive mechanism shown outside the box 144 in FIG. 1a for illustrative purposes. The control box 144 may be equipped with a set of control buttons 146 for the manual control of the gate 110 in the manner described below, and include status switches mounted internally (not shown) for the purposes described below. Dotted lines in FIG. 1a indicate the signals exchanged between the various elements of the mechanism and the control box 144.

The motor 124 is provided with a speed sensor 148 such as an rpm counter which may be of any conventional type. The speed sensor 148 is arranged to furnish a speed signal representative of the speed of motor 124 to the gate speed input 36 of FIG. 1b.

Figure 1B:
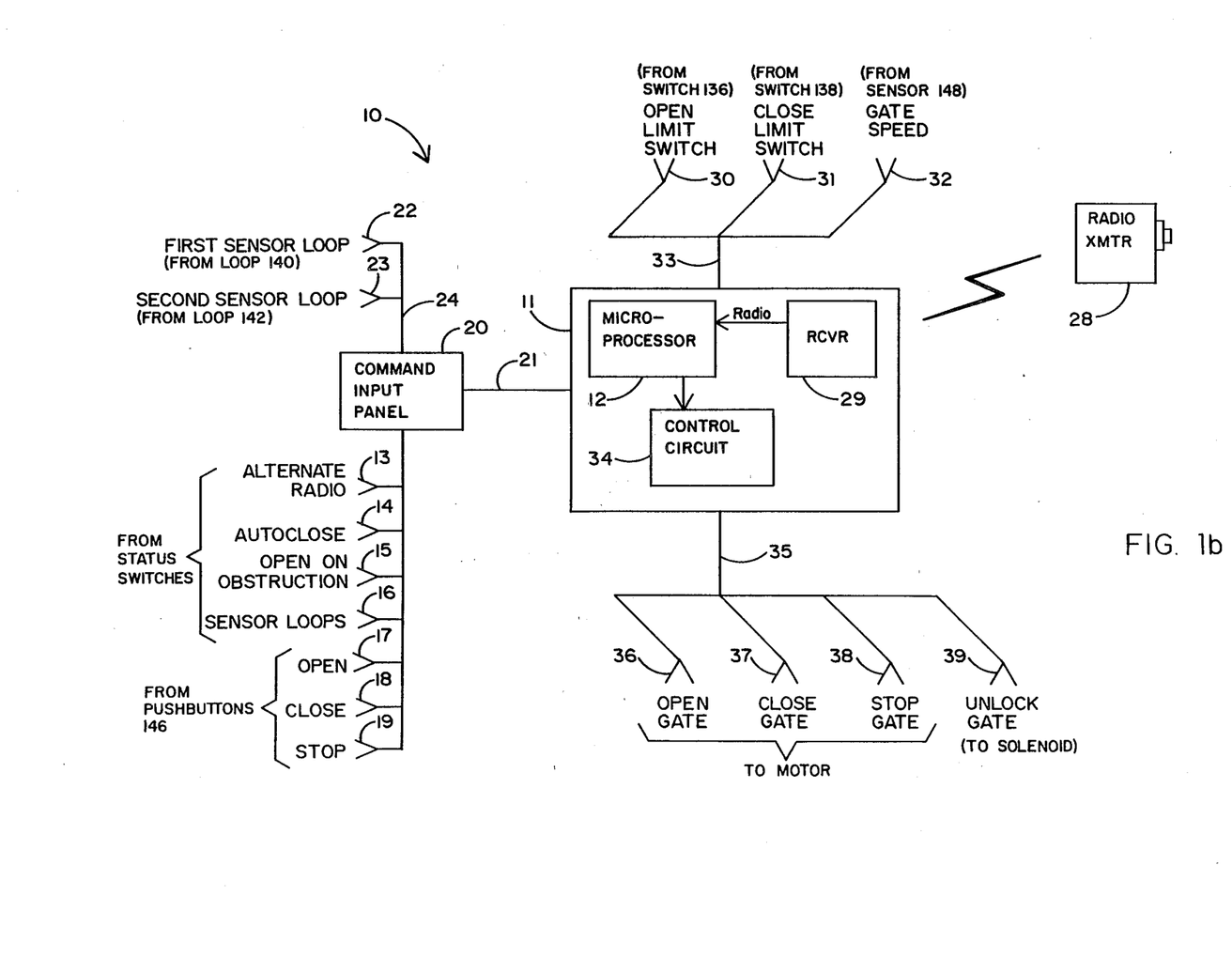
FIG. 1b of the drawings is a schematic block diagram of a gate controller system constructed according to the invention.

FIG. 1b shows, in block form, the control system of this invention, designated generally by reference numeral 10. Although the illustrated system 10 is designed for use with the specific input and output signals illustrated, many changes in the precise arrangement described may be made without departing from the inventive concepts disclosed.

Generally, the system 10 includes a unit 11 housing a microprocessor 12 that is programmed to receive a plurality of input command and data signals and generate a plurality of output control signals in the manner subsequently discussed. The unit 11 may take the form of a conventional cabinet or case housing suitable supporting electrical circuitry. The microprocessor 12 may take the form of any of various known microprocessor chips with suitable memory and programming instructions coded according to known coding techniques to achieve the novel combination of functions described.

First, the microprocessor 12 receives a plurality of input command signals indicative of a plurality of desired gate operations. In the illustrated system 10, these command signals may be produced either by status switches preset upon installation of the system (as in the case of the AUTOCLOSE, OPEN-ON-OBSTRUCTION, ALTERNATE RADIO, and SENSOR LOOP signals), or by the control buttons 146 of FIG. 1a (as in the case of the OPEN, CLOSE, or STOP signals). The command signals determine the desired gate operations as subsequently discussed, and they are coupled to respective ones of input ports 13-19 at a command input panel 20. The input panel 20 may be located adjacent or remote to the unit 11, and it is electrically connected to the microprocessor 12 by appropriate cabling 21.

Additional command signals are supplied by known sensor means adapted to sense a vehicle approaching the gate, such as the sensor loops 140 and 142 (FIG. 1a) that are buried in the roadway on either side of the gate. FIRST SENSOR LOOP and SECOND SENSOR LOOP command signals generated in this manner by respective ones of the the sensor loops 140 and 142 are coupled from the input ports 22 and 23 to the input panel 20 by suitable means, such as a cabling 24. From the input panel 20 the signals are coupled by the cabling 21 to the unit 11 and, by suitable electrical circuitry (not shown), to the microprocessor 12. The FIRST SENSOR LOOP and SECOND SENSOR LOOP command signals provide safety and enable remote control operation as subsequently discussed.

A RADIO command signal is generated by suitable means, such as a transmitter 28 of a type functionally similar to those commonly used with garage door openers. The transmitter 28 transmits this command signal to a receiver 29 in the unit 11 where it is coupled separately by suitable electrical circuitry (not shown to the microprocessor 12. The RADIO command signal also enables remote control operation as subsequently discussed.

The microprocessor 12 also receives a plurality of input data signals indicative of gate position and motor speed. A pair of such data signals indicative of gate position, OPEN LIMIT SWITCH and CLOSED LIMIT SWITCH, are generated by the limit switches 136 and 138, respectively, of FIG. 1a. These data signals are coupled to respective ones of a pair of input ports 30 and 31. Another data signal indicative of gate speed, GATE SPEED, is generated by the speed sensor 148 of FIG. 1a. This data signal is coupled to an input port 32, and the input ports 30-32 are coupled by suitable means, such as a cabling 33 to the unit 11, and from there by suitable electrical circuitry (not shown) to the microprocessor 12.

The microprocessor 12 receives the above-described command signals and data signals and generates control signals accordingly that are coupled by suitable means, such as a control circuit 34 and a cabling 35, to a plurality of output ports 36-39. The control circuit 34 may convert the control signals to suitable motor activating signals, or this may be done by separate circuitry located at the motor. In either event, the control signals generated by the microprocessor 12 and coupled by the control circuit include OPEN GATE, CLOSE GATE, STOP GATE, and UNLOCK GATE control signals that are used to control the gate mechanism in the new and improved manner described below.

Gate control is accomplished utilizing programming means comprising program instructions coded and stored in the microprocessor 12 according to known techniques. The programming means generates the output control signals according to the command signals and data signals. In describing the manner in which this is accomplished, each of the signals and its interrelationship to each of the other signals is first described in greater detail, and then a flow chart is presented to further describe the various programming functions.

The OPEN command signal, or open gate signal, is produced by one of the pushbuttons 146 (FIG. 1a) and is one of the signals referred to as an activate gate signal that is used to command that the gate be opened. Activating this signal at any time that the system 10 is on causes the gate 110 to move toward the open position.

The CLOSE command signal, or close gate signal, is produced by another of the pushbuttons 146 and is an activate gate signal used to command that the gate be closed. Activation of this signal at any time causes the gate 110 to move toward the closed position.

The STOP command signal, or stop gate signal, is produced by the third of pushbuttons 146 and is used to command that the gate be stopped. Activation of this signal at any time causes the gate to stop.

The FIRST SENSOR LOOP and SECOND SENSOR LOOP signals have a dual function. At all times, they are safety signals to prevent the gate 110 from closing while a car is in its path. If the SENSOR LOOPS switch is on, these signals additionally cause the gate 110 to open when a car approaches the gate, and to automatically re-close the gate 110 after the car has passed.

The RADIO command signal is an activate gate signal used to command that the gate be opened. Activating this signal causes the gate to open and then close in the automatic close mode if the ALTERNATE RADIO switch is off. If the ALTERNATE RADIO switch is on, RADIO operates in the alternating mode, i.e., successive occurrences of this signal alternately open and close the gate 110 (or stop it if it is moving).

The AUTOCLOSE command signal is used to command the automatic close mode of operation when the AUTOCLOSE switch is on. In that mode, the gate 110 re-closes automatically a predetermined time (e.g. 30 seconds) after opening. If the AUTOCLOSE switch is off, the alternating mode is used in which the gate 110 stays open until purposely re-closed by a closing signal.

The OPEN-ON-OBSTRUCTION command signal is used to command the opening of the gate 110 upon encountering an obstruction when the OPEN-ON-OBSTRUCTION switch is on. When the switch is off, the gate 110 stops upon encountering an obstruction and waits for a manual reset.

The three data signals are always enabled when the system 10 is on. The OPEN LIMIT SWITCH data signal is used to indicate when the gate has reached the open position. Similarly, the CLOSED LIMIT SWITCH data signal is used to indicate when the gate has reached a closed position, and the GATE SPEED data signal is used to indicate the motor speed and therefore the gate speed.

The four control signals are always enabled when the system 10 is on. The OPEN GATE control signal is used to control the gate motor to cause the gate to open. The CLOSE GATE control signal is used to control the gate motor to cause the gate to close. The STOP GATE control signal is used to brake the motor to cause the gate to stop, and the UNLOCK GATE control signal is used to energize the solenoid 132 (FIG. 1a) to withdraw the locking finger 130 which normally holds the gate 110 in a fixed position.

Figure 2:
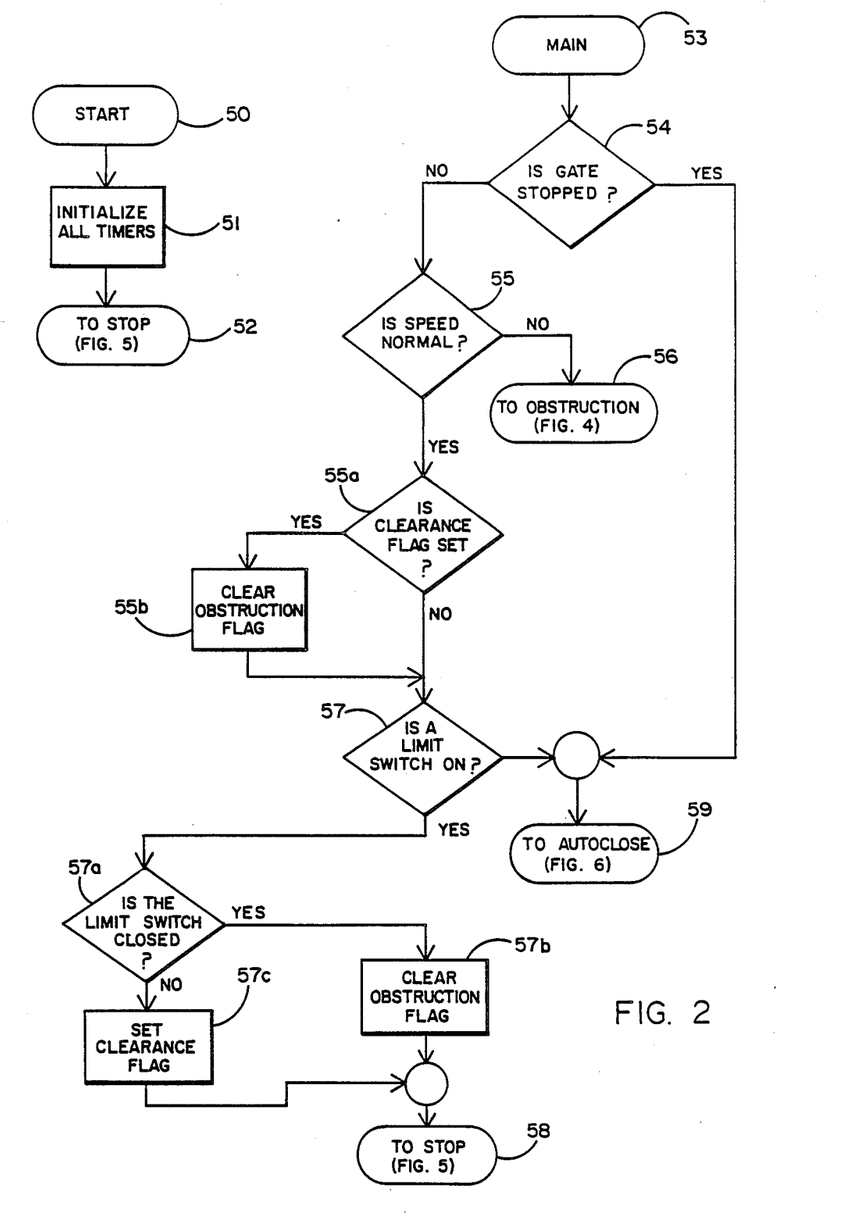
FIGS. 2-7 combine to form a flow chart of the microprocessor operation.

Considering now the flow chart illustrated in FIGS. 2-7, and first the portion of FIG. 2, the program begins when the system 10 is turned on at 50. The program is initialized at 51 and directed to the STOP subroutine at 52.

Figure 5:
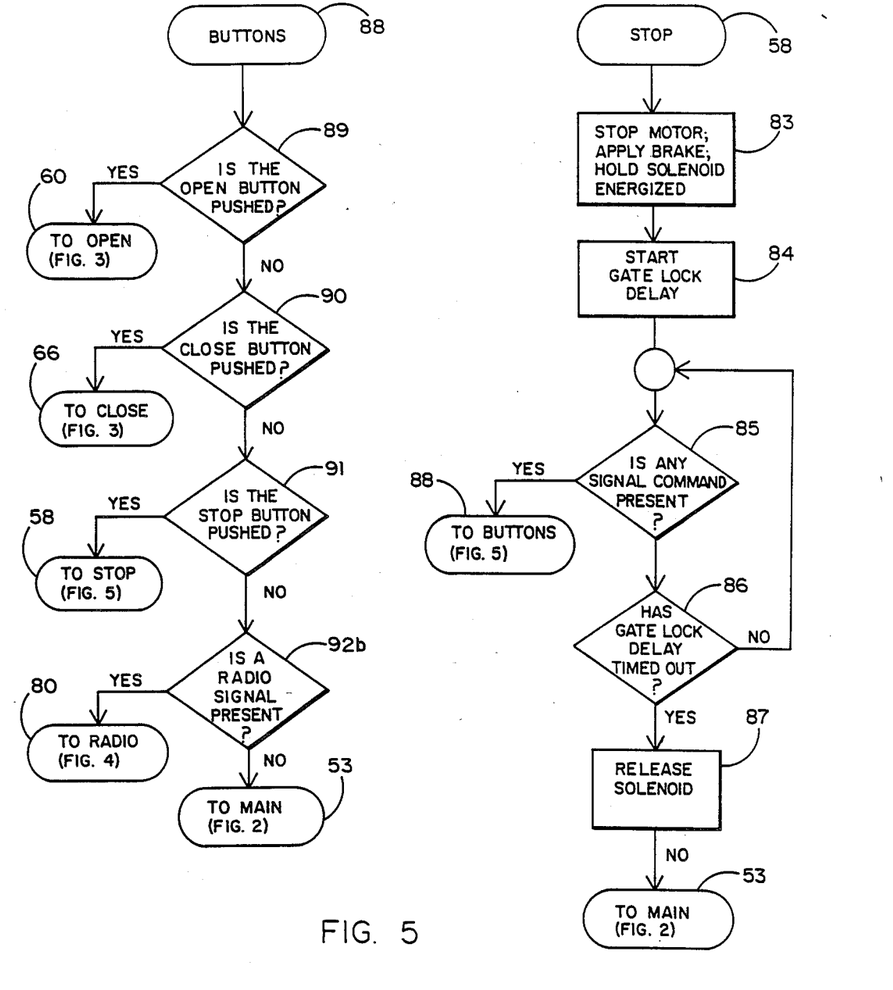

The STOP subroutine commences at 58 in FIG. 5. The STOP GATE command signal is to stop the motor 124, set the brake, and hold the UNLOCK GATE control signal enabled at 83. A time delay is set at 84 to delay disabling of the UNLOCK GATE control signal, and the input command signals are checked at 85 to see if one has been activated. If one has been activated, control is transferred to the BUTTONS subroutine at 88 for the next commanded action. If none have been activated, the program checks at 86 to see if the delay set at 84 has timed out. If it has not, the program loops at this point until it does. Then, program control is directed to 87 where the UNLOCK GATE control signal is deactivated to release solenoid 132 and lock the gate 110. Control is then returned to the MAIN subroutine at 53.

FIG. 2 also shows the MAIN subroutine beginning at 53 to which program control is directed at the end of each gate operation. After entrance at 53, the program checks to see if the last operation was a STOP operation, indicating that the gate 110 is stopped. If the gate 110 is in motion, the gate speed is checked at 55, and if it is below a predetermined level, control is directed to the obstruction subroutine at 56.

If the gate speed is not below the predetermined level, the program first checks at 55a whether the clearance flag described below is set. If it is, it clears at 55b any obstruction flag which may be present. Next, the program checks for the occurrence of either one of the OPEN LIMIT SWITCH and the CLOSED LIMIT SWITCH data signals at 57. If one of these data signals is active, the program determines at 57a which limit switch is on. If it is the closed limit switch 138, any obstruction flag which may previously have been set is cleared at 57b, and the program proceeds to the STOP subroutine at 58. If the actuated limit switch is the open limit switch 136, the program sets a clearance flag at 57c and then proceeds directly to the STOP subroutine at 58.

The reason for this differing operation is that when the gate 110 is fully closed following an obstruction, the obstruction has obviously been removed, and normal operation can resume. On the other hand, if the gate is fully open following an obstruction, the obstruction may still be there, and normal operation should not resume until the gate 110 is re-closed by an appropriate command.

If there is no limit switch signal, control is directed to the AUTOCLOSE subroutine at 59. If in checking for the stop flag at 54 the stop flag is active, program control goes directly to the AUTOCLOSE subroutine at 59.

Figure 6:
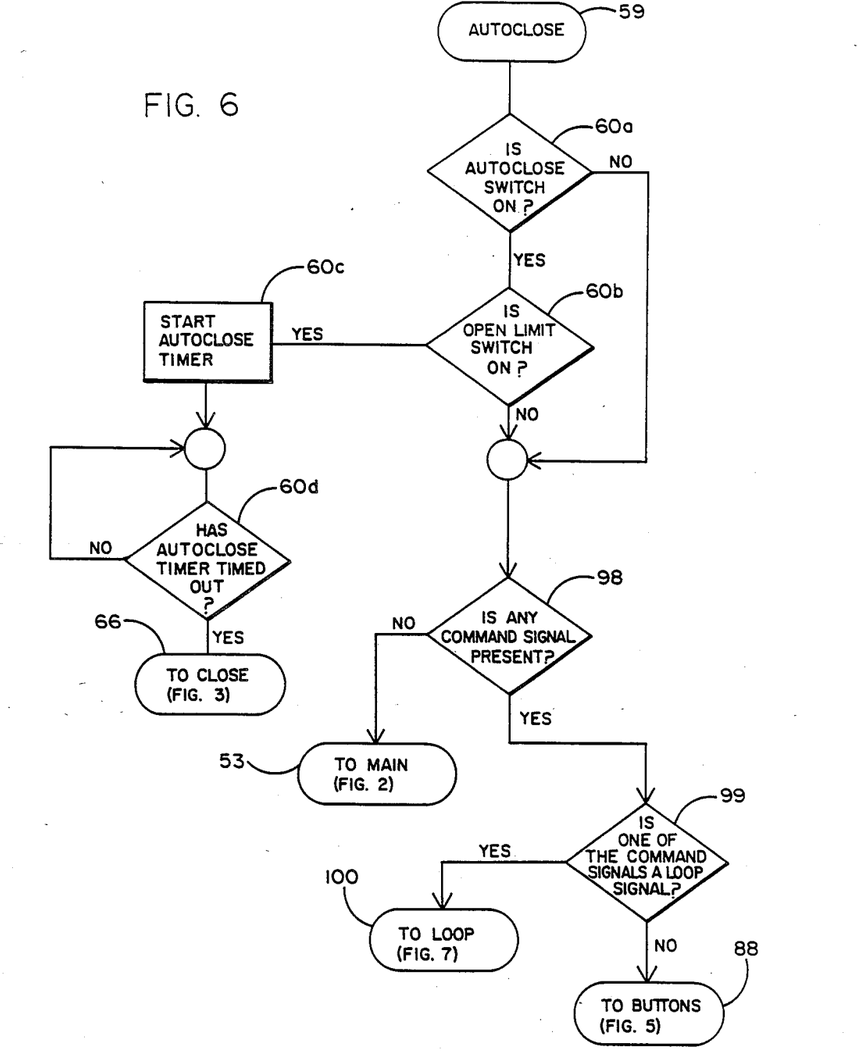

The AUTOCLOSE subroutine commences at 59 in FIG. 6. If the AUTOCLOSE switch is on at 60a and the gate 110 is open (i.e. the open limit switch is on) at 60b, the program starts the autoclose timer at 60c. When the autoclose timer times out at 60d, the program proceeds to the CLOSE subroutine (described below) at 66, and from there returns to the MAIN subroutine at 53.

The program next checks to see if any command input is present. If there is none, the program returns to the MAIN subroutine at 53 and recycles through the MAIN and AUTOCLOSE subroutines.

If any command signals are present, the program first checks to see if one of these signals is a loop signal. If it is, it may be assumed that a car is in the path of the gate 110 or at least dangerously near it, so that any closing motion of the gate 110 is progress must be stopped. In this respect, it should be noted that the CLOSE subroutine merely starts the closing action, but that the program returns to the MAIN subroutine as soon as the gate 110 has come up to speed at the beginning of its closing motion. Therefore, the presence of a loop signal diverts the program to the LOOP subroutine described below. If no loop signals are present, the program finally checks for, and executes, any other commands by way of the BUTTONS subroutine at 88 (FIG. 5). If there are none, the BUTTONS subroutine returns the program to the MAIN subroutine at 53.

The BUTTON subroutine commences at 88 in FIG. 5 and checks each of the manual activate gate command signals at 89–93, directing control to the appropriate subroutine corresponding to the manual input command signal that is activated.

Figure 3:
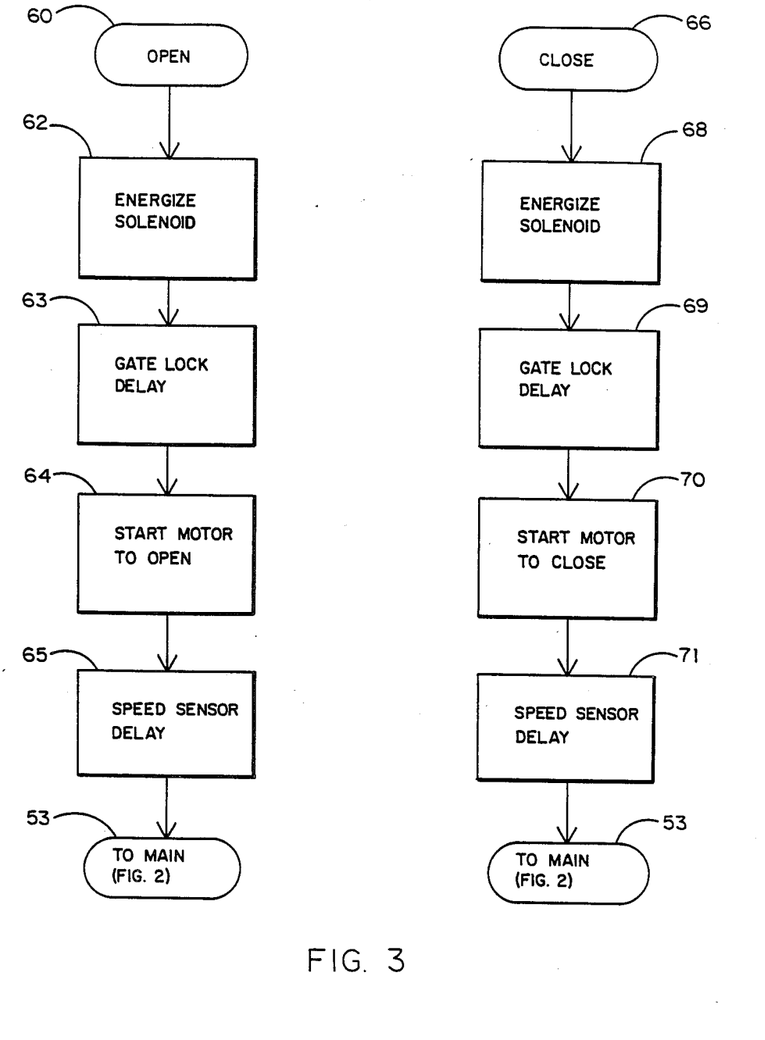

The OPEN subroutine in FIG. 3 commences at 60, and activates the UNLOCK GATE driver means at 62. In the illustrated embodiment, activation of the UNLOCK GATE driver means results in the activation of the solenoid 132 which moves the locking bar 130 out of engagement of the cogs of the gear 128 in the gate's drive train.

After unlocking the gate in this manner, and delaying for a short time at 63, the motor 124 is started to move the gate 110 toward the open position by activating the OPEN GATE driver means at 64. Another delay at 65 allows the gate to come up to speed before control is returned to the MAIN subroutine at 53.

The CLOSE subroutine commences at 66 and activates the UNLOCK GATE driver means at 68 in a manner similar to the OPEN GATE driver means. The short delay at 69 assures that the gate is fully unlocked before energizing the gate's drive motor. The CLOSE GATE control signal is generated at 70 to start the motor 124 for moving the gate 110 toward the closed position, and the delay at 71 allows the gate to attain speed before it is monitored for obstruction. Then, control is returned to the MAIN subroutine at 53.

Figure 4:
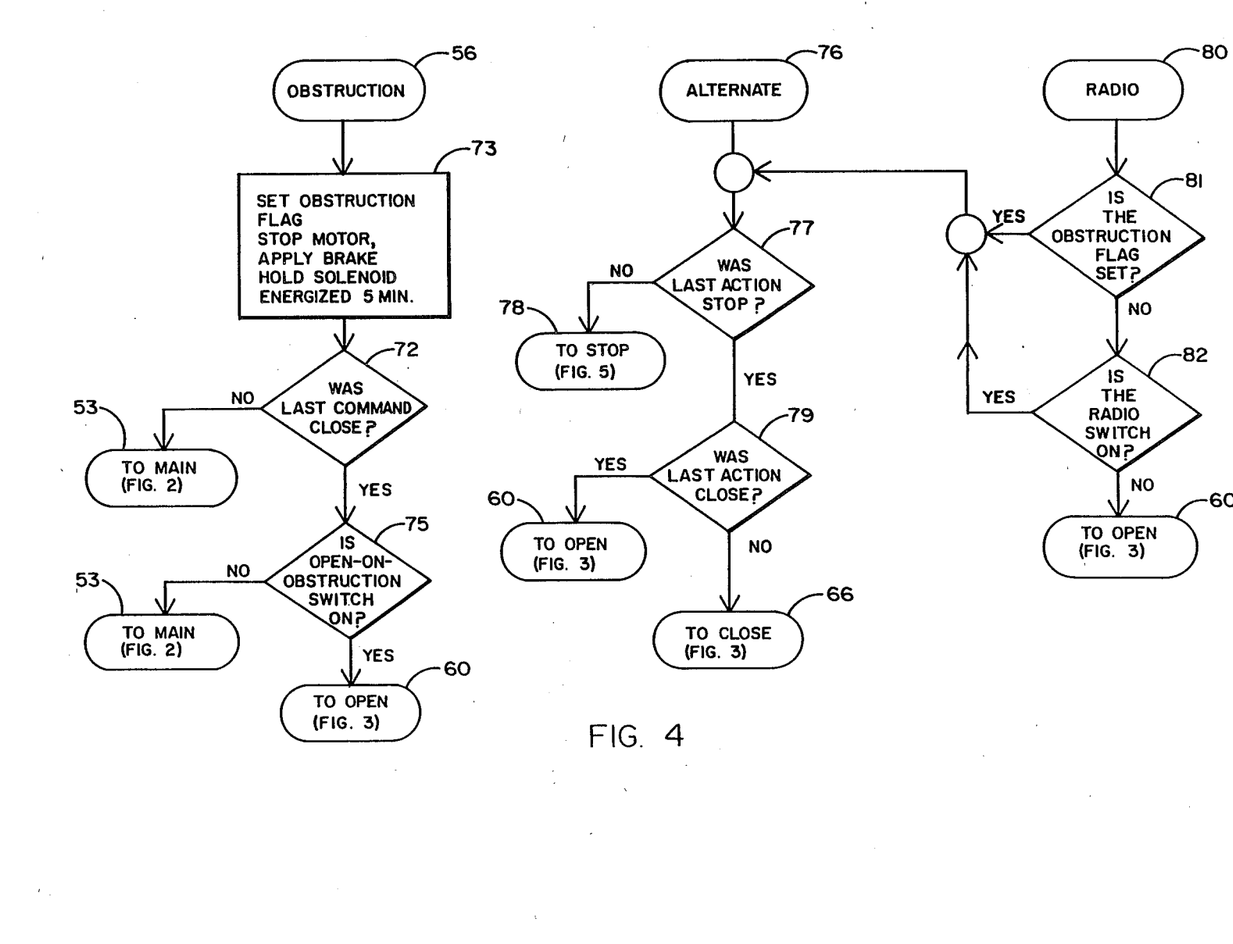

The OBSTRUCTION subroutine in FIG. 4 commences at 56. First, at 73 it activates the STOP GATE control signal to stop the motor 124 and apply the brake. Simultaneously, it sets an obstruction flag in the program and starts a timer which holds solenoid 132 energized for about five minutes.

The OBSTRUCTION subroutine then checks to see whether the last gate activation command was an OPEN command or a CLOSE command. If it was OPEN, program control is returned to the MAIN subroutine and the gate 110 stays where it is. If it was CLOSE, the program checks at 75 to see whether the OPEN-ON-OBSTRUCTION switch is on. If it is, the program diverts to the OPEN subroutine at 60, and the gate 110 re-opens. If it is not, control is returned to the MAIN subroutine at 53, and the gate 110 stays where it is.

The RADIO subroutine commences at 80 (FIG. 4) and checks to see whether the obstruction flag has been set. If it has, control is directed to the ALTERNATE subroutine. If not, the program checks at 82 to see if the ALTERNATE RADIO switch is on. If it is, program control is directed to the ALTERNATE subroutine at 76 and if it is not, program control is directed to the OPEN subroutine at 60.

The ALTERNATE subroutine commences at 76 in FIG. 4. It first checks at 77 to see if the gate is stopped. If it not stopped, control is directed to the STOP routine at 78. If the gate is stopped, the program checks at 79 whether the last action before stopping the gate was to close the gate. If it was, control is directed to the OPEN subroutine at 60 and if it was not, control is directed to the CLOSE subroutine at 66. The ALTERNATE subroutine thus alternately opens and closes the gate 110 (or stops it if it is moving) on successive RADIO signals.

Figure 7:
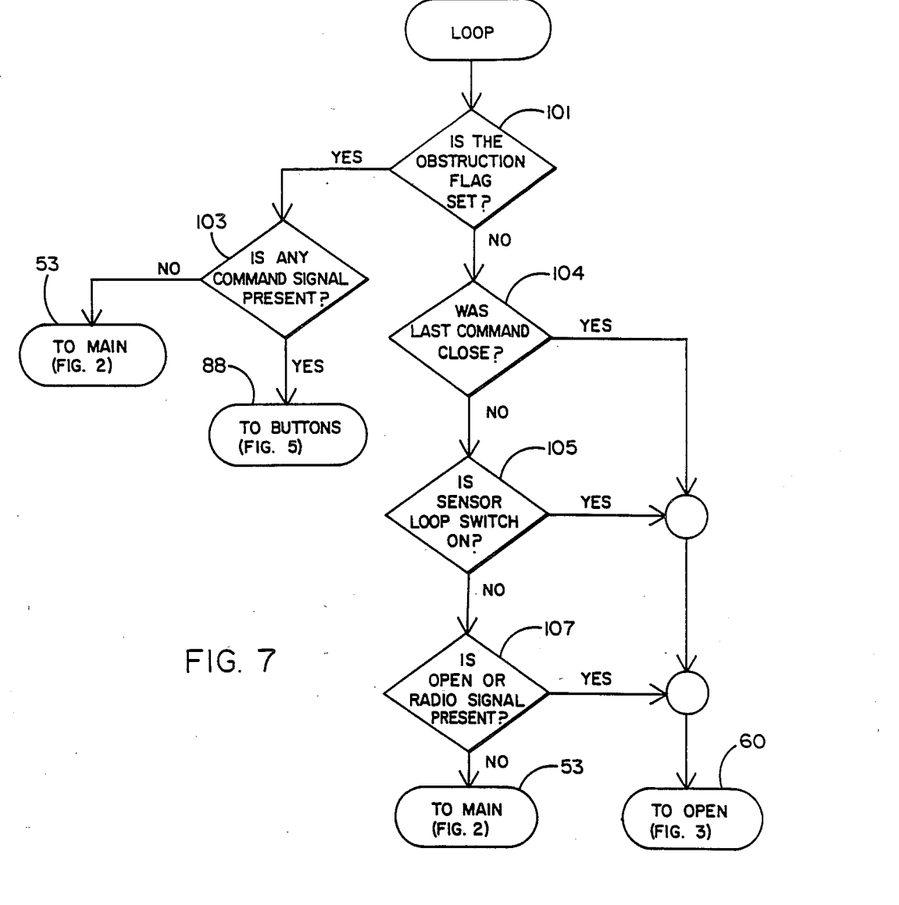

The LOOP subroutine commences at 100 in FIG. 7. The program checks at 101 to determine whether the obstruction flag is on, i.e., whether an obstruction is present. If it is, the loops 140 and 142 are functionally disconnected and the system is left to manual control by checking the presence of any commands at 103 and directing the program to the BUTTONS subroutine at 88 (if there are any), or to the MAIN subroutine at 53 (if there are none).

If no obstruction is determined at 101, the program checks at 104 to see if the last action taken was to move the gate toward the closed position and if it was, control is directed to the OPEN subroutine at 60. This is the safety feature which prevents the gate 110 from hitting a car in its path as it closes. If the last action was anything else, the program checks at 105 to see if the SENSOR LOOPS switch is on. If it is, control is directed to the OPEN subroutine at 60. This causes the gate 110 to open whenever a car approaches it. If the SENSOR LOOPS switch is off, the program checks at 107 to see if the OPEN command signal or the RADIO command signal has been activated. If anyone of these is true, control is directed to the OPEN subroutine at 60. If not, control is directed to the MAIN subroutine at 53.

In accordance with another major aspect of the invention, the gate speed signal which signifies the presence of an obstruction is preset to produce an obstruction indication only when the load on the gate 110, as sensed in terms of the gate's normal operating speed, exceeds a presettable amount. In the preferred embodiment, a load selector 150 (FIG. 1b) is provided between the gate speed input 32 and the unit 11. The load selector 150, under the control of, e.g., manually settable dip switches (not shown), digitally determines by conventional means the level of the speed signal at input 32 which will cause the microprocessor 12 to record an obstruction indication.

It has been found that within reasonable design limits, the normal operating speed of the gate 110 varies only slightly, for any given motor 124 and transmission 126, with the weight and physical location of the gate 110. Thus, instead of empirically adjusting the gate speed which the system considers normal after installation, the minimum normal gate speed would be preset at the factory in accordance with this invention.

With the normal operating speed so preset, substantial reductions of the gate speed can be presumed to have been caused by obstructions. However, not all obstructions need be the result of a dangerous situation in any given installation. For example, debris on the track 114 may frequently affect movement of the gate 110 substantially in environments such as gravel pits or salvage yards without constituting a meaningful obstruction. On the other hand, gates in clean locations where children are likely to play need to be highly sensitive to any obstruction.

The digital load selector 150 makes it possible to precisely adjust the obstruction response to an absolute speed corresponding to a specific obstruction load, e.g. from five to fifty kilograms in five kilogram increments. Thus, after an initial factory setting of the expected normal operating speed, the present invention makes it possible to exactly select, from time to time, the severity of the obstruction which will cause the OBSTRUCTION routine to be entered from the MAIN routine 53 of FIG. 2 at 56.

Thus, the programming means coded to accomplish the functions indicated in the flow chart combine with the microprocessor 12 to provide a superior system for controlling automatic gate operation. It is responsive to obstructions in a manner designed to better inhibit damage or injury to the obstruction as well as to the gate's drive train, and is better able to accommodate different types of uses with positive digital selections.

Although an exemplary embodiment of the invention has been shown and described, many changes, modifications, and substitutions may be made by one having ordinary skill in the art without necessarily departing from the spirit and scope of this invention.

What is claimed is:

1. A system for controlling a gate, comprising:
   (a) motor means for driving said gate;
   (b) locking means for locking said gate against movement;
   (c) microprocessor means connected to said motor means and said locking means for unlocking said gate and for causing said motor means to open and close said gate in response to command signals applied to said microprocessor means; and
   (d) obstruction sensing means connected to said microprocessor means for detecting the occurrence of an obstruction during the motion of said gate;
   (e) said microprocessor means being arranged to normally lock said gate substantially whenever said motor means are stopped, but to maintain said gate unlocked for a predetermined time upon occurrence of said obstruction.

2. A system controlling a gate, comprising:
   (a) motor means for driving said gate;
   (b) radio means for producing radio signals for actuating said gate;
   (c) microprocessor means connected to said motor means for causing said motor means to open and close said gate in response to command signals applied to said microprocessor means, said command signals including said radio signals; and
   (d) obstruction sensing means connected to said microprocessor means for detecting the occurrence of an obstruction during the motion of said gate;
   (e) said microprocessor means being arranged to normally automatically reclose said gate a first predetermined time after opening said gate in response to one of said radio signals, but to disable said automatic reclosing in response to said radio signals and to instead cause said radio signals to produce alternate opening and closing of said gate upon occurrence of said obstruction.

3. A system for controlling a gate, comprising:
   (a) motor means for driving said gate;
   (b) locking means for locking said gate against movement;
   (c) sensor loop means for producing a sensor loop signal when a vehicle is present in the vicinity of said gate;
   (d) radio means for producing radio signals for actuating said gate;
   (e) microprocessor means connected to said motor means and said locking means for unlocking said gate and for causing said motor means to open and close said gate in response to command signals applied to said microprocessor means, said command signals including said radio and sensor loop signals; and (f) obstruction sensing means connected to said microprocessor means for detecting the occurrence of an obstruction during the motion of said gate;

(g) said microprocessor means being arranged to normally automatically reclose said gate a first predetermined time after opening and lock said gate substantially whenever said motor means are stopped, but upon occurrence of said obstruction to stop said gate, disable said automatic reclosing, maintain said gate unlocked for a second predetermined time, and disable said system from responding to said sensor loop signals, and cause said radio signals to produce alternate opening and closing of said gate.

4. A system as recited in claim 3, further comprising:

transmission means for transmitting the motion of said motor means to said gate;

locking means for locking said transmission mean against rotation when said motor means are stopped; and microprocessor means for controlling the operation of said motor means in response to command signals applied to said microprocessor means;

said microprocessor means including delay means arranged to release said locking means a third predetermined time before starting said motor means, and to hold said locking means released until a fourth predetermined time after stopping said motor means.

5. A system as recited in claim 3, further comprising:

speed sensor means associated with said motor means for sensing the speed of said motor means, said speed sensor means being arranged to generate an obstruction signal if the speed of said motor drops below a predetermined level during operation;

said predetermined level being preset to a value below the lowest normal operating speed of said motor means with any gate of a type within the design limits of said motor means.

6. A system for controlling a gate, comprising:

(a) motor means for driving said gate;

(b) transmission means for transmitting the motion of said motor means to said gate;

(c) locking means for locking said transmission means against rotation;

(d) microprocessor means connected to said motor means for causing said motor means to open and close said gate in response to command signals applied to said microprocessor means, said command signals including sensor loop signals;

(e) said microprocessor means including delay means arranged to release said locking means a first predetermined time before starting said motor means, and to hold said locking means released until a second predetermined time after stopping said motor means; and (f) obstruction sensing means connected to said microprocessor means for detecting the occurrence of an obstruction during the motion of said gate;

(g) said obstruction sensing means including speed sensor means for sensing the speed of said motor means, said speed sensor means being arrange to generate an obstruction signal if the speed of said motor drops below a predetermined level during operation:

(h) said predetermined level being preset to a value below the lower normal operating speed of said motor means with any gate of a type within the design limits of said motor means;

(i) said microprocessor means being arranged to normally automatically reclose said gate a first predetermined time after opening, but upon occurrence of said obstruction to stop said gate, disable said automatic reclosing, and disable said system from responding to said sensor loop signals;

(i) command signals including radio signals; and (k) said microprocessor means normally causing said gate to open and then automatically reclose upon receipt of said radio signals, but causing said gate to alternately close and open upon receipt of successive radio signals when an obstruction has occurred.

7. A system for controlling a gate, comprising:

(a) motor means for driving said gate;

(b) transmission means for transmitting the motion of said motor means to said gate;

(c) locking means for locking said transmission means against rotation;

(d) microprocessor means connected to said motor means for causing said motor means to open and close said gate in response to command signals applied to said microprocessor means, said command signals including sensor loop signals;

(e) said microprocessor means including delay means arranged to release said locking means a first predetermined time before starting said motor means, and to hold said locking means released until a second predetermined time after stopping said motor means; and (f) obstruction sensing means connected to said microprocessor means for detecting the occurrence of an obstruction during the motion of said gate;

(g) said obstruction sensing means including speed sensor means associated with said motor means for sensing the speed of said motor means, said speed sensor means being arranged to generage an obstruction signal if the speed of said motor drops below a predetermined level during operation;

(h) said predetermined level being preset to a value below the lowest normal operating speed of said motor means with any gate of a type within the design limits of said motor means;

(i) said microprocessor means being arranged to normally automatically reclose said gate a first predetermined time after opening, but upon occurrence of said obstruction to stop said gate, disable said automatic reclosing, and disable said system from responding to said sensor loop signals;

(j) said microprocessor means being further arranged to normally allow said locking means to lock said transmission means substantially whenever said motor means are stopped, but to maintain said transmission means unlocked for a third predetermined time upon occurrence of said obstruction.

8. A system for controlling a gate, comprising:

(a) motor means for driving said gate;

(b) speed sensor means associated with said motor means for sensing the speed of said motor means, said speed sensor means being arranged to generate an obstruction signal if the speed of said motor drops below a predetermined level during operation; and (c) load selector means for enabling operator adjustment of said predetermined level, said load selector means having a plurality of selectable discrete settings corresponding to predetermined load increments on the gate motor;

(d) whereby the load adjustment is quantized to permit the load level causing generation of an obstruction signal to be repeatably adjusted in accordance with anticipated obstruction loads for various types of obstructions.

9. The system of claim 8, in which said load selector means includes digital switch means for selecting a plurality of absolute speed levels corresponding to substantially equally spaced discrete increments of obstruction loads imposed upon said gate.

* * * * *